United States Patent

[11] 3,601,788

| | | |
|---|---|---|
| [72] | Inventors | Bernard J. Straiser<br>St. Charles;<br>Rue O'Neill, Jr., Ladue, both of, Mo. |
| [21] | Appl. No. | 739,921 |
| [22] | Filed | May 31, 1968 |
| [45] | Patented | Aug. 24, 1971 |
| [73] | Assignee | McDonnell Douglas Corporation<br>ST. Louis, Mo.<br>Continuation of application Ser. No.<br>551,298, May 19, 1966. |

[54] SOUND TRANSDUCER
12 Claims, 4 Drawing Figs.

[52] U.S. Cl. ................................................ 340/8 R
[51] Int. Cl. ................................................ H04r 23/00
[50] Field of Search ........................................ 103/1 M;
340/8

[56] References Cited
UNITED STATES PATENTS
2,756,678  7/1956  Collins ........................ 340/1 M 3,066,607  12/1962  Cole ........................... 340/1 M Primary Examiner—Richard A. Farley
Assistant Examiner—Brian L. Ribando
Attorney—Charles B. Haverstock ABSTRACT: A sound transducer for sending and/or receiving communications through a liquid medium such as through salt water embodied in an open ended tube which fills with the liquid when submerged therein so that the liquid in the tube remains a part of the liquid in which the tube is submerged, means for establishing a magnetic field in a first direction through the liquid in the tube, and means causing electric impulses to pass through the liquid in the tube at an angle relative to the magnetic field to produce pressure changes and corresponding noise signals in the liquid in the tube, said noise signals radiating outwardly from the tube into the surrounding liquid. The means for causing electric impulses may be substituted for by means responsive to signals radiated in the liquid by other similar devices at remote locations to act as a receiver thereof.

PATENTED AUG 24 1971  3,601,788
FIG. 1.
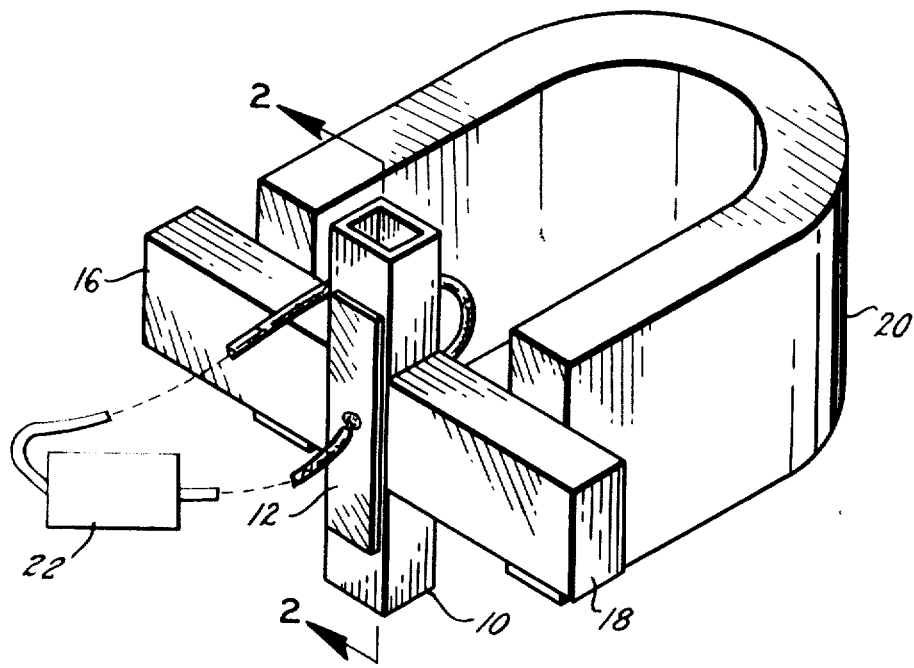
FIG. 2.
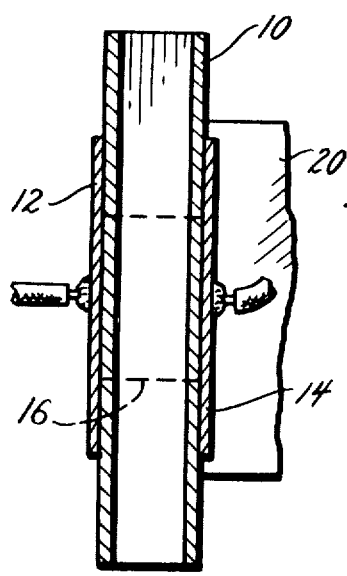
FIG. 3.
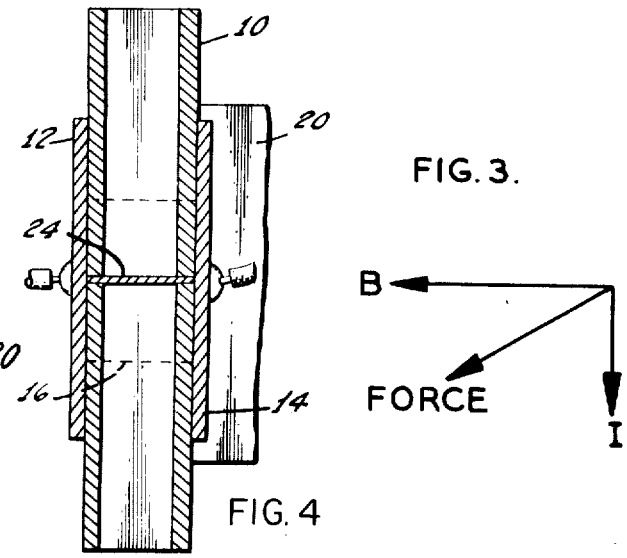
FIG. 4
INVENTORS
BERNARD J. STRALSER
RUE O'NEILL, JR.
BY Charles B. Haverstock
ATTORNEY

SOUND TRANSDUCER

This application is a continuation of copending Stralser et al. application Ser. No. 551,298, filed May 19, 1966.

The present invention relates generally to sound transducers and like devices and more particularly to a transducer device which operates when submerged in a conductive liquid such as salt water.

Many signal producing devices including sound transducers are available and in use. None of the known devices, however, depends for its operation on the environment in which it is located, and it has not heretofore been proposed, so far as known, to construct a sound transducer which is designed to operate when submerged in a conducting liquid such as salt water. The present invention fills this need by teaching the construction and operation of a noise producing device or transducer capable of operating submerged in a conducting fluid and capable of generating a broad frequency spectrum of noise signals which can be used for many purposes including underwater communication devices and the like.

The subject transducer comprises conduit means that fill with fluid when the device is submerged, and means for moving the fluid through the conduit means in response to the simultaneous application of magnetic and electrical energy applied through the conduit means and through the fluid therein at a particular angular relationship. As fluid moves through the conduit and is expelled therefrom pressure changes occur in the fluid and these changes produce noise signals which can be used for various purposes including for underwater communications applications, SONAR applications, sonobuoy applications, fathometer applications, and many others. More specifically, the subject device includes means establishing a magnetic field transversely across an open ended channel filled with a conducting fluid and means for passing electric current through the conducting fluid in the channel at an angle relative to the magnetic field so that the combined forces produced by the magnetic field and the current produce forces which acts on the fluid to cause the fluid to move in the conduit and to produce the desired pressure changes. A device of the same or similar construction can also be used to receive signals thus produced.

A main object of the present invention is to provide sound transducer means capable of operating when submerged in a conducting fluid such as salt water.

Another object is to provide transducer means for generating a relatively wide band of frequency signals.

Another object is to provide a relatively inexpensive sound transducer that operates when immersed in salt water or some other conducting fluid.

Another object is to teach the construction and operation of a transducer which depends for its operation on the environment in which it is located.

Another object is to provide a sound transducer having no movable parts.

Another object is to provide a relatively simple and inexpensive underwater communication link.

Another object is to provide a sound transducer having improved impedance matching characteristics obtained by using water-to-water coupling.

These and other objects and advantages of the present invention will become apparent after considering the following detailed specification which covers a preferred embodiment of the device in conjunction with the accompanying drawing, wherein:

FIG. 1 is a perspective view showing a sound transducer constructed according to the present invention;

FIG. 2 is an enlarged fragmentary cross-sectional view taken on line 2—2 of FIG. 1;

FIG. 3 is a vector diagram showing the forces developed by the present device and, FIG. 4 is an enlarged fragmentary cross-sectional view similar to FIG. 2 but showing a modified form of the subject device.

Referring to the drawings more particularly by reference numbers, the number 10 refers to an open ended channel member or conduit having a pair of spaced opposed electrodes 12 and 14 positioned on opposite sides thereof. The electrodes can be attached to the inside or outside surfaces of the channel, and when a voltage is applied between electrodes current will flow through a conducting liquid in the channel.

Two spaced opposed magnetic pole pieces 16 and 18 are positioned adjacent to the channel 10 abutting opposite sides thereof, as shown in FIG. 1. One surface of each of the pole pieces 16 and 18 abuts the channel 10 and another surface of each abuts a different opposite end of a C-shaped magnetic member such as permanent magnet 20. The magnet 20 and the associated pole pieces 16 and 18 cooperate to establish a magnetic field through the channel member 10.

As already stated, the subject device operates when submerged in an electrically conducting liquid such as salt water. The operation is produced by applying a voltage between the electrodes 12 and 14 to cause current to flow through the conductive fluid between the electrodes 12 and 14. This current flows at an angle relative to the magnetic field produced by the magnet 20 and the combination of the current flow and the magnetic field acts on the conducting fluid causing the fluid to move in the channel as will be explained. The most efficient operation occurs when the electrodes 12 and 14 are so positioned that the current flow therebetween is substantially at right angles to the magnetic field established between the pole pieces 16 and 18. Under these conditions the combination of the flux and current vectors produced by the magnetic field and the current produces a force vector at right angles to both the current and the magnetic vectors, which force vector operates on the fluid causing fluid to flow in one end of the channel 10 and out the other. The vector forces are illustrated diagrammatically in FIG. 3, where B represents the magnetic flux vector produced by the magnetic field, I represents the current vector produced by the current flow through the fluid between the electrodes 12 and 14, and the force vector is the resultant vector operating on the fluid as a result of the vectors B and I. The force vector is a maximum when the vectors B and I are at right angles.

It is usually preferred to use a permanent magnet to establish the flux vector component B because this simplifies the construction and eliminates the need for a separate energy source therefor. However, where greater outputs are required, an electromagnet can also be used. Many different energy sources can also be used to produce the voltages between the electrodes 12 and 14. A particularly desirable source is a pulse generator 22 that produces relatively narrow sharp energy pulses at a controlled frequency. Such a source may require relatively little power, and at the same time the voltage peaks can be made relatively large thereby producing relatively large short duration force vectors to operate on the liquid. The effect of the combination of a constant flux vector and relatively large voltage pulses across the electrodes causes the fluid to be expelled from the channel in spurts which produce accompanying relatively wide spectrum noise frequency outputs. These outputs can be used for a variety of purposes including in underwater communication and location systems, SONAR applications, sonobuoy applications, in fathometers and so on. Thus the present device provides inexpensive means for producing noise signals having broad frequency characteristics.

The broad frequency characteristics are an important advantage because it substantially increases the utility of the subject device. The present device has advantages over known underwater communication systems such as SONAR because it has improved water-to-water coupling since the water in the conduit is in contact with the surrounding water in which the device is submerged. This also provides improved impedance matching characteristics of the water at the ends of the conduit and improves the energy transfer efficiency. The subject device can also be made in many sizes and shapes and can be excited by various electric and magnetic means. As noted above, the device can also be used as a transmitter and/or as a receiver, and it can be used with or without a diaphragm or similar means 24 such as shown in the modified form of the device in FIG. 4. The diaphragm 24 is positioned to respond to the fluid movements and pressure changes generated in the fluid but prevents flow of fluid through the channel or conduit 10. The flow or volume capacity of the fluid conduit also effects the amount of force produced per unit volume of fluid for a given magnetic field and voltage source. For example, in a small volume conduit greater pressure changes will be produced in the fluid than in a larger one. The present device therefore is an improved and more efficient noise transducer and/or receiver than has been available heretofore, and it has many possible uses, particularly undersea uses.

Thus there has been shown and described a novel sound producing or sound receiving instrument or transducer particularly suitable for use when submerged in salt water which fulfills all of the objects and advantages sought therefor. Many changes, modifications, variations and other uses and applications of the subject device will, however, become apparent to those skilled in the art after considering this specification and the accompanying drawing.

All such changes, modifications, alterations and other uses and applications which do not depart from the spirit and scope of the invention are deemed to be covered by the invention which is limited only by the claims which follow.

1. A sound transducer operable submerged in a conducting liquid such as salt water comprising an open ended conduit adapted to fill with the conducting liquid when submerged so that the liquid in the conduit and the surrounding liquid remain as parts of the same body of liquid, permanent magnet means having pole portions positioned adjacent to opposite sides of the conduit for establishing a magnetic field through the liquid contained therein, other means including a pair of electrodes positioned adjacent opposite sides of the conduit, a source of electric energy impulses between said electrodes causing current impulses through the conducting liquid in the conduit, said electrodes being positioned to cause the current impulses in the liquid to be at an angle relative to the magnetic field, the simultaneous presence of the magnetic field and the current impulses producing corresponding pressure impulses in the liquid in the conduit, said pressure impulses producing noise signals in the liquid which radiate outwardly from the conduit into the liquid in which the conduit is submerged.

2. Means for producing underwater noise signals comprising an open ended flow tube adapted to fill with salt water when submerged therein so that the salt water in the flow tube is part of the same body of salt water in which the flow tube is submerged, means including permanent magnet means having spaced poles positioned adjacent opposite sides of the flow tube to establish a magnetic field through the flow tube and through the salt water contained therein, a pair of spaced electrodes positioned adjacent to opposite sides of the flow tube, an electric pulse generator connected between said electrodes, said pulse generator producing current impulses through the salt water in the conduit means between the said electrodes, said electrodes being located to cause the current impulses through the salt water to be at an angle relative to the magnetic field, said magnetic field and said current impulses combining to produce vector force components which produce corresponding pressure changes in the salt water in the flow tube, said pressure changes producing noise signals in the salt water in the flow tube which signals radiate outwardly therefrom into the surrounding salt water in which the flow tube is submerged.

3. The means for producing underwater noise signals defined in claim 2 wherein the current impulses pass through the salt water in the flow tube substantially at right angles to the magnetic field.

4. The means defined in claim 2 wherein said pulse generator includes means for producing relatively short peaked voltage impulses.

5. A sound transducer operable submerged in salt water comprising an open ended flow tube adapted to fill with salt water when submerged therein so that the salt water in the flow tube remains a part of the body of salt water in which the flow tube is submerged, means including magnetic means having spaced opposite polarity pole pieces positioned on opposite sides of the flow tube to establish a magnetic field across the flow tube and the salt water contained therein at a first direction, other means causing current impulses to flow through the salt water in the tube within the limits of the magnetic field but at an angle relative to the magnetic field, the simultaneous presence of the magnetic field and the current impulses being accompanied by corresponding force vectors present in the salt water in the flow tube, said force vectors being accompanied by corresponding pressure impulses in the salt water in the tube and corresponding noise signals whose characteristics vary with the characteristics of the current impulses and the magnetic field, said noise signals radiating outwardly from the flow tube into the salt water in which the flow tube is submerged.

6. The sound transducer defined in claim 5 wherein said means establishing a magnetic field includes a permanent magnet having spaced north and south poles positioned on opposite sides of the flow tube.

7. The sound transducer defined in claim 5 wherein a diaphragm member is positioned extending across the flow tube to prevent liquid flow therethrough.

8. The sound transducer defined in claim 5 wherein said other means causing current impulses to flow include a pulse generator.

9. Means for receiving sound signals propagated in a fluid medium having electrical conducting characteristics comprising an open ended conduit adapted to be submerged in a conducting fluid medium so that the fluid in the conduit remains a part of the same body of fluid in which the conduit is submerged and through which the sound signals are propagated, means establishing a substantially constant magnetic field in a first direction transversely through the fluid in the conduit, means responsive to pressure wave sound signals propagated in the fluid medium, said pressure wave responsive means including a pair of spaced electrodes positioned on opposite sides of the conduit at an angle relative to the magnetic field and electric energy producing means connected between said electrodes including means responsive to electric currents produced in the fluid in the conduit due to the pressure wave sound signals propagating in the fluid including the fluid in the conduit in the presence of the magnetic field, said electrical energy producing means producing energy responses that vary with the characteristics of the pressure wave sound signals.

10. The means defined in claim 9 wherein a diaphragm is positioned extending across the flow tube preventing fluid flow therethrough.

11. Means for transmitting and receiving signals in salt water comprising similar transmitter and receiver means spaced from each other and each including an open ended conduit submerged in the salt water medium, means associated with each conduit for establishing a magnetic field through the salt water contained therein, means associated with the conduit at the transmitter means for establishing current flow through the salt water contained therein at an angle relative to the magnetic field therethrough, the simultaneous presence of said magnetic field and said current flow producing pressure changes in the fluid medium, and means associated with the conduit at the receiver means for responding to the pressure changes produced in the fluid medium by the transmitter means.

12. The means defined in claim 11 wherein at least one of said conduits includes a diaphragm positioned to respond to pressure changes produced therein.

75